US006346496B2

(12) United States Patent
Nabika et al.

(10) Patent No.: US 6,346,496 B2
(45) **Date of Patent: *Feb. 12, 2002**

(54) COMPOSITE MATERIAL FOR POSITIVE TEMPERATURE COEFFICIENT THERMISTOR, CERAMIC FOR POSITIVE TEMPERATURE COEFFICIENT THERMISTOR AND METHOD FOR MANUFACTURING CERAMICS FOR POSITIVE TEMPERATURE COEFFICIENT THERMISTOR

(75) Inventors: Yasuhiro Nabika; Tetsukazu Okamoto, both of Omihachiman; Toshiharu Hirota, Hikone; Noriyuki Yamamoto, Gamo-gun, all of (JP)

(73) Assignee: Murata Manufacturing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,313

(22) Filed: Jul. 23, 1999

(30) Foreign Application Priority Data

Jul. 24, 1998 (JP) .......................................... 10-209026
Jun. 18, 1999 (JP) .......................................... 11-172136

(51) Int. Cl.[7] ............................................ C04B 35/468

(52) U.S. Cl. ...................... 501/137; 501/138; 501/139; 269/617; 269/676

(58) Field of Search ......................... 338/22 R, 225 D; 252/520.21, 520.22; 501/137, 138, 139; 264/617, 676

(56) References Cited

U.S. PATENT DOCUMENTS 2,976,505 A * 3/1961 Ichikawa .................. 338/22 R
2,981,699 A * 4/1961 Ichikawa ............... 252/520.21
3,231,522 A * 1/1966 Blodgett et al. ....... 252/520.21
3,373,120 A * 3/1968 Nitta et al. ............ 252/520.21
3,673,119 A * 6/1972 Ueoka et al. .......... 252/520.21
4,096,098 A * 6/1978 Umeya et al. ......... 252/520.21
4,126,583 A 11/1978 Walter
4,222,783 A * 9/1980 Atsumi et al. .............. 501/139
5,219,811 A * 6/1993 Enomoto et al. ...... 252/520.21
5,314,651 A * 5/1994 Kulwicki .................... 501/137
5,733,833 A * 3/1998 Abe et al. ................... 501/137
5,815,063 A * 9/1998 Goto et al. ............... 338/22 R
6,187,707 B1 * 2/2001 Kakihara et al. ........... 501/138

FOREIGN PATENT DOCUMENTS

EP 0642140 A1 3/1995
EP 0280819 A2 9/1998
JP 3-35503 * 2/1991 ............. 338/22 SD

OTHER PUBLICATIONS

Patent Abstracts of Japan, vol. 015, No. 263 (C–0847), Jul. 4, 1991 & JP 03 088770 A (Central Glass Co. Ltd.) Apr. 15, 1991, Abstract.

* cited by examiner

*Primary Examiner*—Karl Group
(74) *Attorney, Agent, or Firm*—Ostrolenk, Faber, Gerb & Soffen, LLP

(57) ABSTRACT

A ceramic for the PTC thermistor having a resistivity at room temperature of 5 Ω·cm or less, static withstanding voltage of 60 V/mm or more and temperature resistance coefficient of 9.0 %/° C., having small dispersion of the resistance, is composed of principal components of about 30 to 97 mol % of $BaTiO_3$, about 1 to 50 mol % of $PbTiO_3$, about 1 to 30 mol % of $SrTiO_3$ and about 1 to 25 mol % of $CaTiO_3$ (the total content of them being 100 mol %), as well as about 0.1 to 0.3 mole of Sm, about 0.01 to 0.03 mole of Mn and 0 to about 2.0 mole of Si relative to 100 moles of the principal components, the composite material being preferably heat-treated in an oxidative atmosphere after being fired in a reducing or neutral atmosphere for obtaining the ceramic.

10 Claims, 1 Drawing Sheet

COMPOSITE MATERIAL FOR POSITIVE TEMPERATURE COEFFICIENT THERMISTOR, CERAMIC FOR POSITIVE TEMPERATURE COEFFICIENT THERMISTOR AND METHOD FOR MANUFACTURING CERAMICS FOR POSITIVE TEMPERATURE COEFFICIENT THERMISTOR

BACKGROUND OF THE INVENTION

1. Field of the Invention

The present invention relates to a composite material for a positive temperature coefficient thermistor (referred to PTC thermistor hereinafter), ceramics for use in the PTC thermistor and a method for manufacturing the PTC thermistor.

2. Description of the Related Art

Related art concerning the present invention are disclosed in Japanese laid-open Patent Application Nos. 3-88770 and No. 3-54165.

The former application discloses a barium titanate based semiconductor ceramic composition for use in the PTC thermistor containing, as principal components, 45 to 85 molar percentage (mol %) of $BaTiO_3$, 1 to 20 mol % of $PbTiO_3$, 1 to 20 mol % of $SrTiO_3$ and 5 to 20 mol % of $CaTiO_3$ as well as 0.1 to 0.3 mol % of a semiconductor forming agent, 0.006 to 0.025 mol % of Mn and 0.1 to 1 mol % of $SiO_2$ as additives, wherein $BaTiO_3$, $PbTiO_3$, $SrTiO_3$ and $CaTiO_3$ as principal components are formed by a citric acid method.

The application describes that characteristic values such as a resistivity at room temperature of 8 Ω·cm or less (4 to 8 Ω·cm), a temperature resistance coefficient α of 9%/° C. or more and an static withstanding voltage of 60 V/mm or more can be obtained with respect to the ceramic composition. The laid-open text also shows examples using La, Sb and Nb as semiconductor forming agents.

The latter laid-open text discloses a barium titanate based semiconductor ceramic composition for use in the PTC thermistor containing, as principal components, 45 to 87 mol % of $BaTiO_3$, 3 to 20 mol % of $PbTiO_3$, 5 to 20 mol % of $SrTiO_3$ and 5 to 15 mol % of $CaTiO_3$ as well as 0.2 to 0.5 mol % of a semiconductor forming agent, 0.02 to 0.08 mol % of Mn and 0 to 0.45 mol % of $SiO_2$ as additives, wherein $BaTiO_3$, $PbTiO_3$, $SrTiO_3$ and $CaTiO_3$ as principal components are formed by a liquid phase method.

The publication shows that characteristic values such as a resistivity at room temperature of 3 to 10 Ω·cm and an static withstanding voltage of 10 to 200 V/mm can be obtained with respect to the ceramic composition. It also shows examples using Sb, Y and La as semiconductor forming agents.

La, Sb, Nb and Y are used as a semiconductor forming agent in the examples disclosed in the foregoing two patent publications. However, these semiconductor forming agents involve problems, as shown in the comparative examples hereinafter. It is a problem that the resistance is largely dispersed when La, Sb or Nb are used for the semiconductor forming agent, although the resistivity at room temperature becomes low. The resistivity at room temperature can not be lowered when Y is used for the semiconductor forming agent.

SUMMARY OF THE INVENTION

The present invention provides a composite material for the PTC thermistor as well as a ceramic for use in the PTC thermistor obtained by firing the composite material, and a method for manufacturing the same.

In a first aspect, the present invention provides, in short, a composite material for the PTC thermistor using Sm as a semiconductor forming agent or, in more detail, a composite material for a PTC thermistor containing as principal components about 30 to 97 molar percentage (mol %) of $BaTiO_3$, about 1 to 50 mol % of $PbTiO_3$, about 1 to 30 mol % of $SrTiO_3$ and about 1 to 25 mol % of $CaTiO_3$ (wherein the total content of them accounts for 100 mol %), and containing as additives about 0.1 to 0.3 mole of Sm in terms of elemental Sm in a compound containing Sm, about 0.01 to 0.03 mole of Mn in terms of elemental Mn in a compound containing Mn and 0 to about 2.0 mole of Si in terms of elemental Si in a compound containing Si, relative to 100 mole of the principal components.

The present invention also provides a ceramic for use in the PTC thermistor obtained by firing the composite material as described above. In a second aspect, the present invention provides a ceramic for use in a PTC thermistor containing as principal components about 30 to 97 molar percentage (mol %) of $BaTiO_3$, about 1 to 50 mol % of $PbTiO_3$, about 1 to 30 mol % of $SrTiO_3$ and about 1 to 25 mol % of $CaTiO_3$ (wherein the total content of them accounts for 100 mol %), and containing as additives about 0.1 to 0.3 mole of Sm calculated as Sm in samarium oxide, about 0.01 to 0.03 mole of Mn in terms of Mn in manganese oxide and 0 to about 2.0 mole of Si in terms of Si in silicon oxide, relative to 100 mole of the principal components.

The present invention also provides a ceramic for use in the PTC thermistor obtained by firing the composite material for the PTC thermistor according to the first aspect in a neutral atmosphere followed by heat-treatment in an oxidative atmosphere.

The present invention also provides a ceramic for use in the PTC thermistor obtained by firing the composite material for the PTC thermistor according to the first aspect in a reducing atmosphere followed by heat-treatment in an oxidative atmosphere.

The present invention also provides a method for manufacturing a ceramic for use in the PTC thermistor.

In one aspect, the present invention provides a method for manufacturing the ceramic for use in the PTC thermistor with the step of firing the composite material for the PTC thermistor in a neutral atmosphere followed by heat-treating in an oxidative atmosphere.

In another aspect, the present invention provides a method for manufacturing the ceramic for use in the PTC thermistor with the step of firing the composite material for the PTC thermistor in a reducing atmosphere followed by heat-treatment in an oxidative atmosphere.

A nitrogen atmosphere may be used for the neutral atmosphere while air containing about 20% of oxygen or a high oxygen containing atmosphere containing about 100% of oxygen may be used for the oxidative atmosphere. An atmosphere containing 1% of hydrogen and 99% of nitrogen may be used for the reducing atmosphere.

DESCRIPTION OF THE PREFERRED EMBODIMENTS

EXAMPLE 1

Figure 1:
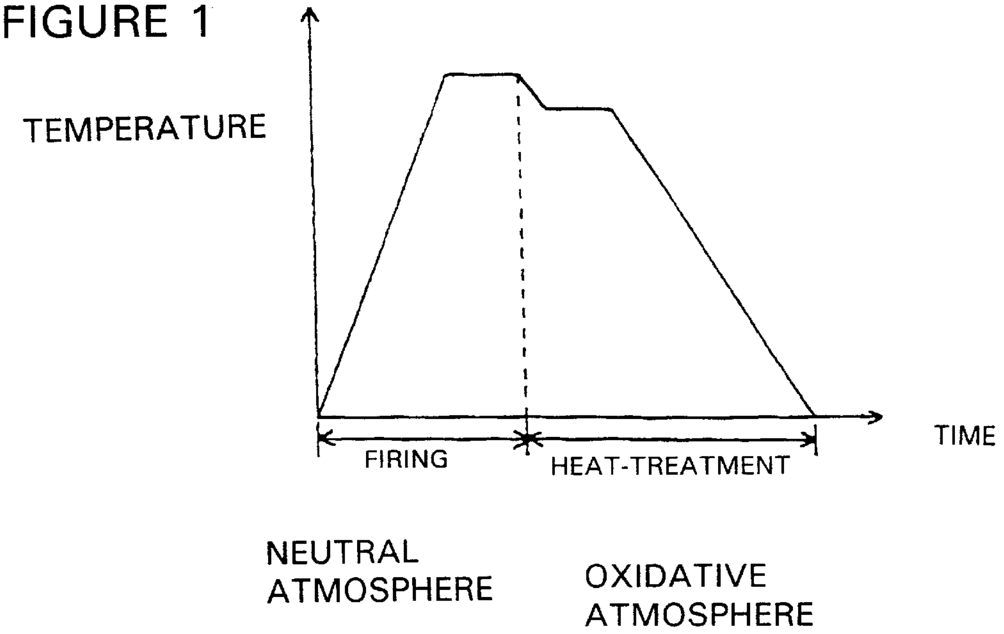
FIG. 1 shows a firing profile used for executing Example 2 or 5 according to the present invention.

$BaCO_3$, $TiO_2$, PbO, $SrCO_3$, $CaCO_3$, $Sm_2O_3$, $MnCO_3$ and $SiO_2$ were used as starting materials and they were mixed in the proportions shown in TABLE 1 with wet mixing. The term "Ba", "Pb", "Sr" and "Ca" in TABLE 1 denote the composition ratios of "$BaTiO_3$", "$PbTiO_3$", "$SrTiO_3$" and "$CaTiO_3$", respectively. The composition ratios of "$BaTiO_3$", "$PbTiO_3$", "$SrTiO_3$" and "$CaTiO_3$" to serve as principal components are expressed by mol % units (the combined amount of them accounts for 100%) while "Sm", "Mn" and "$SiO_2$" to serve as additives are expressed in mol % relative to 100 moles of the principal component.

TABLE 1

| No. | Ba | Pb | Sr | Ca | Sm | Mn | $SiO_2$ | |
|---|---|---|---|---|---|---|---|---|
| 1-1 | 97.0 | 1 | 1 | 1 | 0.2 | 0.02 | 1 | |
| 1-2 | 60.0 | 10 | 15 | 15 | 0.2 | 0.02 | 1 | |
| 1-3 | 40.0 | 30 | 15 | 15 | 0.2 | 0.02 | 1 | |
| 1-4 | 20.0 | 50 | 15 | 15 | 0.2 | 0.02 | 1 | * |
| 1-5 | 30.0 | 50 | 10 | 10 | 0.2 | 0.02 | 1 | |
| 1-6 | 30.0 | 60 | 5 | 5 | 0.2 | 0.02 | 1 | * |
| 1-7 | 74.0 | 10 | 1 | 15 | 0.2 | 0.02 | 1 | |
| 1-8 | 45.0 | 10 | 30 | 15 | 0.2 | 0.02 | 1 | |
| 1-9 | 35.0 | 10 | 40 | 15 | 0.2 | 0.02 | 1 | * |
| 1-10 | 74.0 | 10 | 15 | 1 | 0.2 | 0.02 | 1 | |
| 1-11 | 50.0 | 10 | 15 | 25 | 0.2 | 0.02 | 1 | |
| 1-12 | 45.0 | 10 | 15 | 30 | 0.2 | 0.02 | 1 | * |
| 1-13 | 60.0 | 10 | 15 | 15 | 0.05 | 0.02 | 1 | * |
| 1-14 | 60.0 | 10 | 15 | 15 | 0.1 | 0.02 | 1 | |
| 1-15 | 60.0 | 10 | 15 | 15 | 0.3 | 0.02 | 1 | |
| 1-16 | 60.0 | 10 | 15 | 15 | 0.4 | 0.02 | 1 | * |
| 1-17 | 60.0 | 10 | 15 | 15 | 0.2 | 0.005 | 1 | * |
| 1-18 | 60.0 | 10 | 15 | 15 | 0.2 | 0.01 | 1 | |
| 1-19 | 60.0 | 10 | 15 | 15 | 0.2 | 0.03 | 1 | |
| 1-20 | 60.0 | 10 | 15 | 15 | 0.2 | 0.04 | 1 | * |
| 1-21 | 60.0 | 10 | 15 | 15 | 0.2 | 0.02 | 2 | |
| 1-22 | 60.0 | 10 | 15 | 15 | 0.2 | 0.02 | 3 | * |

The mark "*" denotes that the composition is out of the range of the present invention.

Each mixture shown in TABLE 1 was then dehydrated and dried and, after calcinating at 1100 to 1200° C., a binder was added for granulation. The granulated particles were subjected to a uniaxial press molding and the molded body obtained was fired at 1300 to 1400° C. in the air to obtain a sintered disk with a diameter of 11.0 mm and a thickness of 0.5 mm.

Respective sintered disks were used for ceramics for use in the PTC thermistor. In-Ga electrodes were formed on each principal face of the ceramic disk to obtain a PTC thermistor as a sample piece.

The resistivity at room temperature ($\rho_{25}$), static withstanding voltage and temperature resistance coefficient ($\alpha$), as well as dispersion of the resistance (CV %), were determined with respect to the PTC thermistor using each sample.

In more detail, the temperature resistance coefficient ($\alpha$) was calculated by the following equation:

$$\alpha=[ln(\rho_2/\rho_1)/(T_2-T_1)]\times 100(\%/^\circ\text{ C.})$$

wherein $\rho_1$ denotes the resistivity at 10 times $\rho_{25}$ and and $T_1$ denotes the corresponding temperature while $\rho_2$ denotes the resistivity at 100 times $\rho_{25}$ and and $T_2$ denotes the corresponding temperature.

Scattering of the resistance (CV %) was evaluated from the variation of the resistivity at room temperature among each lot containing 10 pieces of the PTC thermistors manufactured under the same conditions using respective compositions shown in TABLE 1. The values were actually determined by the following equation:

$$CV\%=(\text{standard deviation of } \rho_{25} \text{ among 10 lots})/(\text{mean value of } \rho_{25} \text{ among 10 lots})\times 100$$

TABLE 2 shows the resistivity at room temperature ($\rho_{25}$), static withstanding voltage, and the temperature resistance coefficient ($\alpha$) and its scattering (CV %).

TABLE 2

| No. | $\rho_{25}$ ($\Omega\cdot$cm) | STATIC WITH-STANDING VOLTAGE (V/mm) | $\alpha$(%/° C.) | SCATTERING OF RESISTANCE (CV %) | |
|---|---|---|---|---|---|
| 1-1 | 2.1 | 60 | 10.0 | 3.2 | |
| 1-2 | 3.1 | 90 | 11.5 | 3.5 | |
| 1-3 | 3.9 | 110 | 13.0 | 3.9 | |
| 1-4 | 5.3 | 120 | 14.1 | 3.8 | * |
| 1-5 | 4.9 | 110 | 13.1 | 3.9 | |
| 1-6 | 5.5 | 105 | 12.7 | 4.0 | * |
| 1-7 | 2.7 | 75 | 10.3 | 3.3 | |
| 1-8 | 4.5 | 100 | 12.6 | 3.8 | |
| 1-9 | 6.6 | 105 | 13.2 | 5.5 | * |
| 1-10 | 2.8 | 70 | 10.4 | 3.4 | |
| 1-11 | 4.1 | 100 | 12.2 | 3.7 | |
| 1-12 | 5.2 | 105 | 12.5 | 3.9 | * |
| 1-13 | 5.6 | 115 | 13.6 | 4.3 | * |
| 1-14 | 4.5 | 105 | 12.9 | 3.6 | |
| 1-15 | 3.2 | 75 | 10.1 | 3.5 | |
| 1-16 | 4.1 | 60 | 8.7 | 3.6 | * |
| 1-17 | 2.0 | 55 | 9.4 | 3.1 | * |
| 1-18 | 2.3 | 70 | 10.0 | 3.4 | |
| 1-19 | 4.8 | 110 | 13.0 | 3.8 | |
| 1-20 | 7.3 | 130 | 14.4 | 5.2 | * |
| 1-21 | 4.2 | 100 | 12.3 | 3.7 | |
| 1-22 | 5.5 | 110 | 12.7 | 4.3 | * |

The mark "*" denotes that the composition is out of the range of the present invention.

PTC thermistors were manufactured as comparative examples using respective compositions in TABLE 3 by the same method as used in Examples. While $Sm_2O_3$ was used as a starting material for the semiconductor forming agent in the foregoing examples, $La_2O_3$, $Y_2O_3$, $Sb_2O_3$ and $Nb_2O_3$ were used as a starting material for each semiconductor forming agent in the comparative examples.

TABLE 3

| No. | Ba | Pb | Sr | Ca | SEMICONDUCTOR FORMING AGENT | Mn | $SiO_2$ |
|---|---|---|---|---|---|---|---|
| 1-23 | 60.0 | 10 | 15 | 15 | La 0.2 | 0.02 | 1 |
| 1-24 | 60.0 | 10 | 15 | 15 | Y 0.25 | 0.02 | 1 |
| 1-25 | 60.0 | 10 | 15 | 15 | Sb 0.2 | 0.02 | 1 |
| 1-26 | 60.0 | 10 | 15 | 15 | Nb 0.2 | 0.02 | 1 |

The term "Ba", "Pb", "Sr" and "Ca" in TABLE 3 denote, as in TABLE 1, the composition ratios of "$BaTiO_3$", "$PbTiO_3$", "$SrTiO_3$" and "$CaTiO_3$", respectively. The composition ratios of "$BaTiO_3$", "$PbTiO_3$", "$SrTiO_3$" and "$CaTiO_3$" to serve as principal components are expressed by mol % (the combined amount of them accounts for 100%) while "the semiconductor forming agents (La, Y, Sb and Nb)", "Mn" and "S" to serve as additives are expressed in mol % relative to 100 moles of the principal components.

Respective characteristics of the samples in the comparative examples were evaluated by the same method as used in the examples described above. The results are listed in TABLE 4

TABLE 4

| No. | $\rho_{25}$ ($\Omega\cdot$cm) | STATIC WITHSTANDING VOLTAGE (V/mm) | $\alpha$(%/° C.) | SCATTERING OF RESISTANCE (CV %) |
|---|---|---|---|---|
| 1-23 | 2.9 | 85 | 10.0 | 7.0 |
| 1-24 | 6.0 | 120 | 12.5 | 3.4 |

TABLE 4-continued

| No. | $\rho_{25}$ ($\Omega \cdot$ cm) | STATIC WITHSTANDING VOLTAGE (V/mm) | α(%/° C.) | SCATTERING OF RESISTANCE (CV %) |
|---|---|---|---|---|
| 1-25 | 2.8 | 75 | 9.5 | 7.0 |
| 1-26 | 3.1 | 80 | 9.5 | 6.5 |

It is evident from TABLE 1 and TABLE 2 that characteristics such as the resistivity at room temperature ($\rho_{25}$) of 5 Ω·cm or less, static withstanding voltage of 60 V/mm or more and temperature resistance coefficient (α) of 10%/° C. or more are obtained with less variation of the temperature resistance coefficient among the lots with respect to the PTC thermistors manufactured using the composite material for the PTC thermistors having the compositions within the range of the present invention.

Samples 1-4, 1-6, 1-9, 1-12, 1-13, 1-20 and 1-22 having compositions out of the range of the present invention have, on the other hand, a resistivity at room temperature ($\rho_{25}$) of more than 5 Ω·cm while samples 1-16 and 1-17 have a temperature resistance coefficient (α) of less than 10%/° C.

Although it is possible to lower the resistivity at room temperature ($\rho_{25}$) in the samples 1-23, 1-25 and 1-26 in which La, Sb and Nb are used as semiconductor forming agents, respectively, as shown in TABLE 3 and TABLE 4, scattering of the values among the lots is increased as compared with the samples shown in TABLE 1 and TABLE 2. The resistivity at room temperature ($\rho_{25}$) can not be sufficiently lowered in the sample 1-24 in which Y is used as the semiconductor forming agent.

Accordingly, Sm is used for the semiconductor forming agent in the examples according to the present invention in order to obtaining the effects hitherto described. It is believed this result is because the ionic radius of Sm is appropriate for obtaining the foregoing effect.

TABLE 5 below show the ionic radii of the semiconductor forming agents used in the examples and comparative examples.

TABLE 5

| | IONIC SPECIES | IONIC RADIUS (Å) |
|---|---|---|
| Ba SITE | $Ba^{2+}$ | 1.61 |
| 12-COORDINATION | $La^{3+}$ | 1.36 |
| NUMBER | $Sm^{3+}$ | 1.24 |
| | $Y^{3+}$ | 0.96 |
| Ti SITE | $Ti^{4+}$ | 0.61 |
| 6-COORDINATION | $Nb^{5+}$ | 0.64 |
| NUMBER | $Sb^{5+}$ | 0.60 |

While the Ba-site can be in principle substituted with the trivalent ions La, Sm and Y judging from ionic radii of these ions, a part of them are thought to occupy the Ti-site. The proportions of substitution of the Ti-site with these ions La, Sm and Y are supposed to be increased as the ionic radii of them become smaller in the order of Y>Sm>La. An acceptor level is generated when the Ti-site is substituted with these trivalent ions, trapping free electrons generated by substitution of the Ba site with these ions.

Accordingly, the trapping probability of the liberated free ions with the acceptors becomes higher when Y having a small ionic radius and higher probability of Ti-site substitution is used for the semiconductor forming agent. Although the rate of change of the resistivity against the amount of addition of Y is small (the resistivity is stable to the amount of addition of Y), the resistivity of the thermistor has not been sufficiently reduced by the addition of Y as seen in the sample 1-24 in TABLE 4.

An acceptor level is hardly formed to reduce the resistivity when La having a higher tendency for substituting the Ba-site is used as the semiconductor forming agent. However, the rate of change of the resistivity against the addition of La becomes so large that dispersion of the resistivity among the lots becomes larger, as shown in the sample 1-23 in TABLE 4.

Sm has an ability to lower the resistivity and reduce dispersion of the resistivity among the lots since the ionic radius of Sm is within an appropriate range.

While the Ti-site may be in principle substituted with Nb or Sb judging from their ionic radii, the acceptor level is never formed even when the Ti-site is substituted with Nb or Sb since the ion serves as a pentavalent ion, the ion serving as ions similar to La.

EXAMPLE 2

The firing profile shown in FIG. 1 is used in this Example 2 in the firing step of the molded body comprising the composite material for the PTC thermistor. In short, after firing the molded body in a neutral atmosphere such as $N_2$ atmosphere, the molded body is heat-treated in an oxidative atmosphere such as in a high oxygen concentration atmosphere or in the air in order to obtain the ceramic for use in the PTC thermistor.

Except for the firing profile as described above, the molded bodies of the examples and comparative examples in Example 2 were obtained by the same treatment as described in the examples and comparative examples in Example 1 using the same compositions listed in TABLE 1 and TABLE 3. Electrodes were formed on the sintered bodies after firing by the same method as in Example 1 to manufacture the PTC thermistors to evaluate their characteristics.

The neutral atmospheres for firing under the firing profile and oxidative atmospheres for the heat-treatment shown in FIG. 1 are applied for respective samples shown in TABLE 6 below.

TABLE 6

| No. | FIRING ATMOSPHERE | HEAT-TREATMENT ATMOSPHERE | |
|---|---|---|---|
| 2-1 | $N_2$ 100% | $O_2$ 100% | |
| 2-2-1 | $N_2$ 100% | $O_2$ 100% | |
| 2-2-2 | $N_2$ 100% | $O_2$ 20% | |
| 2-3 | $N_2$ 100% | $O_2$ 100% | |
| 2-4 | $N_2$ 100% | $O_2$ 100% | * |
| 2-5 | $N_2$ 100% | $O_2$ 100% | |
| 2-6 | $N_2$ 100% | $O_2$ 100% | * |
| 2-7 | $N_2$ 100% | $O_2$ 100% | |
| 2-8 | $N_2$ 100% | $O_2$ 100% | |
| 2-9 | $N_2$ 100% | $O_2$ 100% | * |
| 2-10 | $N_2$ 100% | $O_2$ 100% | |
| 2-11 | $N_2$ 100% | $O_2$ 100% | |
| 2-12 | $N_2$ 100% | $O_2$ 100% | * |
| 2-13 | $N_2$ 100% | $O_2$ 100% | * |
| 1-14 | $N_2$ 100% | $O_2$ 100% | |
| 2-15 | $N_2$ 100% | $O_2$ 100% | |
| 2-16 | $N_2$ 100% | $O_2$ 100% | * |
| 2-17 | $N_2$ 100% | $O_2$ 100% | * |
| 2-18 | $N_2$ 100% | $O_2$ 100% | |
| 2-19 | $N_2$ 100% | $O_2$ 100% | |
| 2-20 | $N_2$ 100% | $O_2$ 100% | * |
| 2-21 | $N_2$ 100% | $O_2$ 100% | |
| 2-22 | $N_2$ 100% | $O_2$ 100% | * |

The mark (*) denotes that the composition is out of the range of the present invention.

The resistivity at room temperature ($\rho_{25}$), static withstanding voltage, temperature resistance coefficient (α) and scattering of the resistivity (CV %) of each sample in TABLE 6 are listed in TABLE 7 below.

TABLE 7

| No. | $\rho_{25}$ (Ω · cm) | STATIC WITHSTANDING VOLTAGE | α(%/° C.) | SCATTERING OF RESISTIVITY (CV %) | |
|---|---|---|---|---|---|
| 2-1 | 1.8 | 60 | 11.0 | 3.0 | |
| 2-2-1 | 2.3 | 70 | 12.5 | 3.2 | |
| 2-2-2 | 2.2 | 70 | 12.0 | 3.1 | |
| 2-3 | 2.7 | 85 | 14.0 | 3.5 | |
| 2-4 | 3.6 | 85 | 15.1 | 3.9 | * |
| 2-5 | 3.3 | 90 | 14.1 | 3.1 | |
| 2-6 | 3.6 | 75 | 13.7 | 3.9 | * |
| 2-7 | 2.1 | 60 | 11.3 | 3.2 | |
| 2-8 | 3.2 | 75 | 13.6 | 3.4 | |
| 2-9 | 4.4 | 70 | 14.2 | 3.8 | * |
| 2-10 | 2.1 | 65 | 11.4 | 3.1 | |
| 2-11 | 2.8 | 75 | 13.2 | 3.4 | |
| 2-12 | 3.6 | 80 | 13.5 | 3.8 | * |
| 2-13 | 3.9 | 90 | 14.6 | 3.9 | * |
| 2-14 | 3.1 | 85 | 13.9 | 3.2 | |
| 2-15 | 2.4 | 65 | 11.1 | 3.1 | |
| 2-16 | 2.8 | 45 | 9.7 | 3.3 | * |
| 2-17 | 1.7 | 55 | 10.4 | 3.2 | * |
| 2-18 | 1.8 | 60 | 11.0 | 3.2 | |
| 2-19 | 3.2 | 85 | 14.0 | 3.6 | |
| 2-20 | 4.8 | 90 | 15.4 | 3.9 | * |
| 2-21 | 3.0 | 85 | 13.3 | 3.3 | |
| 2-22 | 3.7 | 80 | 13.7 | 3.5 | * |

The mark (*) denotes that the composition is out of the range of the present invention.

Sample numbers 2-1 to 2-22 in TABLE 6 and 7 correspond to the sample numbers 1-1 to 1-22 in TABLE 1 and TABLE 2, respectively, in which the samples same sample numbers have the same compositions with each other.

Samples with the sample number 2-2 in TABLE 6 and TABLE 7 were thermally-treated under different two kinds of oxidative atmospheres in the firing profile shown in FIG. 1. Accordingly, the samples were distinguished with each other by attaching sub-numbers as 2-2-1 and 2-2-2.

TABLE 7 shows that the samples with compositions within the range of the present invention have the resistivities at room temperature ($\rho_{25}$) of 3.5 Ω·cm or less, static withstanding voltages of 50 V/mm or more and temperature resistance coefficients of 11.0%/° C., enabling one to obtain the PTC thermistors with small variation of resistance (CV %).

When the resistivities at room temperature ($\rho_{25}$) is especially noticed, lower values could be obtained in the samples in TABLE 6 and TABLE 7 having compositions within the range of the present invention as compared with the samples in the foregoing TABLE 2 whose compositions are within the range of the present invention, because the effect of firing in a neutral atmosphere and heat-treatment in an oxidative atmosphere had been expressed to increase the grain size in the ceramic due to such firing and heat-treatment.

It is also evident from the comparison between the samples 2-2-1 and 2-2-2 in TABLE 6 and TABLE 7 that the oxygen concentration during the heat-treatment step in the firing profile shown in FIG. 1 has substantially no effects on the characteristics of the PTC thermistors at an oxygen concentration from 20 to 100%.

When comparing the samples having the compositions within the range of the present invention with the samples having the compositions out of the range of the present invention in TABLE 7, then the same tendencies as the comparison of these samples in TABLE 2 are recognizable.

The comparative examples in which semiconductor forming agents other than Sm were used are listed in TABLE 8 and TABLE 9 below. TABLE 8 shows the neutral atmospheres for firing and oxidative atmosphere for the heat-treatment to be applied to each sample as in TABLE 6, while TABLE 9 shows the results of evaluations as shown in TABLE 7.

TABLE 8

| No. | FIRING ATMOSPHERE | HEAT-TREATMENT ATMOSPHERE |
|---|---|---|
| 2-23 | $N_2$ 100% | $O_2$ 100% |
| 2-24 | $N_2$ 100% | $O_2$ 100% |
| 2-25 | $N_2$ 100% | $O_2$ 100% |
| 2-26 | $N_2$ 100% | $O_2$ 100% |

TABLE 9

| No. | $\rho_{25}$ (Ω · cm) | STATIC WITHSTANDING VOLTAGE (V/mm) | α (%/° C.) | SCATTERING OF RESISTANCE (CV %) |
|---|---|---|---|---|
| 2-23 | 2.1 | 65 | 10.0 | 6.3 |
| 2-24 | 4.0 | 80 | 12.0 | 3.1 |
| 2-25 | 2.0 | 60 | 9.5 | 6.5 |
| 2-26 | 2.2 | 60 | 9.5 | 6.2 |

Sample numbers 2-23 to 2-26 in TABLE 8 and 9 correspond to the sample numbers 1-23 to 1-26 in TABLE 3 and TABLE 4, respectively, in which the same compositions are used in the samples with the same sample numbers with each other.

In comparing the samples in the comparative examples shown in TABLE 9 with the samples with the compositions within the range of the present invention shown in TABLE 7, or comparing the samples in the comparative examples shown in TABLE 4 with the samples with the compositions within the range of the present invention shown in TABLE 2, the same tendencies in the former comparison are also seen in the latter comparison. However, it can be understood that the effect for decreasing the resistivity at room temperature ($\rho_{25}$) by firing in a neutral atmosphere and heat-treatment in an oxidative atmosphere is recognizable in the comparative examples when the comparative examples shown in TABLE 9 are compared with the comparative examples shown in TABLE 4.

EXAMPLE 3

Figure 2:
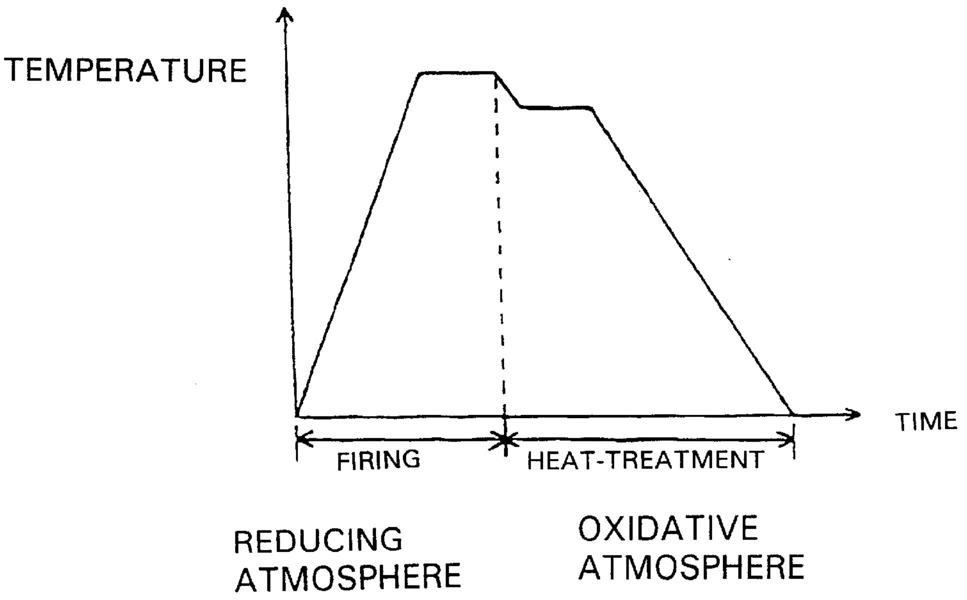
FIG. 2 is a firing profile used for executing Example 3 or 6 according to the present invention.

The firing profile shown in FIG. 2 is used in Example 3 for firing the molded bodies comprising the composite materials for the PTC thermistors. In short, after firing the molded bodies in a reducing atmosphere such as the $H_2/N_2$ atmosphere, the molded bodies were heat-treated in an oxidative atmosphere such as in a high oxygen concentration atmosphere or in air.

Except for the firing profile as described above, the molded bodies of the examples and comparative examples in Example 3 were obtained by the same treatment as described in the examples and comparative examples in Example 1 using the same compositions listed in TABLE 1 and TABLE 3. Electrodes were formed on the sintered bodies after firing by the same method as in Example 1 to manufacture the PTC thermistors to evaluate their characteristics.

The reducing atmospheres for firing under the firing profile and oxidative atmospheres for the heat-treatment shown in FIG. 2 are applied for respective samples are shown in TABLE 10 below.

TABLE 10

| No. | FIRING ATMOSPHERE | HEAT-TREATMENT ATMOSPHERE | |
|---|---|---|---|
| 3-1 | $H_2$ 1%/$N_2$ 99% | $O_2$ 100% | |
| 3-2-1 | $H_2$ 1%/$N_2$ 99% | $O_2$ 100% | |
| 3-2-2 | $H_2$ 1%/$N_2$ 99% | $O_2$ 20% | |
| 3-3 | $H_2$ 1%/$N_2$ 99% | $O_2$ 100% | |
| 3-4 | $H_2$ 1%/$N_2$ 99% | $O_2$ 100% | * |
| 3-5 | $H_2$ 1%/$N_2$ 99% | $O_2$ 100% | |
| 3-6 | $H_2$ 1%/$N_2$ 99% | $O_2$ 100% | * |
| 3-7 | $H_2$ 1%/$N_2$ 99% | $O_2$ 100% | |
| 3-8 | $H_2$ 1%/$N_2$ 99% | $O_2$ 100% | |
| 3-9 | $H_2$ 1%/$N_2$ 99% | $O_2$ 100% | * |
| 3-10 | $H_2$ 1%/$N_2$ 99% | $O_2$ 100% | |
| 3-11 | $H_2$ 1%/$N_2$ 99% | $O_2$ 100% | |
| 3-12 | $H_2$ 1%/$N_2$ 99% | $O_2$ 100% | * |
| 3-13 | $H_2$ 1%/$N_2$ 99% | $O_2$ 100% | * |
| 3-14 | $H_2$ 1%/$N_2$ 99% | $O_2$ 100% | |
| 3-15 | $H_2$ 1%/$N_2$ 99% | $O_2$ 100% | |
| 3-16 | $H_2$ 1%1$N_2$ 99% | $O_2$ 100% | * |
| 3-17 | $H_2$ 1%/$N_2$ 99% | $O_2$ 100% | * |
| 3-18 | $H_2$ 1%/$N_2$ 99% | $O_2$ 100% | |
| 3-19 | $H_2$ 1%/$N_2$ 99% | $O_2$ 100% | |
| 3-20 | $H_2$ 1%/$N_2$ 99% | $O_2$ 100% | * |
| 3-21 | $H_2$ 1%/$N_2$ 99% | $O_2$ 100% | |
| 3-22 | $H_2$ 1%/$N_2$ 99% | $O_2$ 100% | * |

mark (*) denotes that the composition is out of the range of the present ivention.

The resistivities at room temperature ($\rho_{25}$), static withstanding voltage, temperature resistance coefficient ($\alpha$) and scattering of resistance (CV %) of each sample in TABLE 10 are shown in TABLE 11.

TABLE 11

| No. | $\rho_{25}$ ($\Omega \cdot$ cm) | STATIC WITH-STANDING VOLTAGE (V/mm) | $\alpha$(%/° C.) | SCATTERING OF RESISTIVITY (CV %) | |
|---|---|---|---|---|---|
| 3-1 | 1.7 | 60 | 10.8 | 2.9 | |
| 3-2-1 | 2.3 | 70 | 12.8 | 3.2 | |
| 3-2-2 | 2.1 | 70 | 11.7 | 3.3 | |
| 3-3 | 2.6 | 85 | 13.8 | 3.5 | |
| 3-4 | 3.6 | 85 | 15.1 | 3.8 | * |
| 3-5 | 3.2 | 90 | 13.8 | 3.1 | |
| 3-6 | 3.6 | 75 | 13.5 | 3.8 | * |
| 3-7 | 2.0 | 60 | 11.0 | 3.2 | |
| 3-8 | 3.2 | 75 | 13.6 | 3.0 | |
| 3-9 | 4.3 | 70 | 14.0 | 3.8 | * |
| 3-10 | 2.1 | 65 | 11.2 | 3.0 | |
| 3-11 | 2.6 | 75 | 13.0 | 3.4 | |
| 3-12 | 3.6 | 80 | 13.5 | 3.7 | * |
| 3-13 | 3.8 | 90 | 14.3 | 3.9 | * |
| 3-14 | 3.1 | 85 | 13.9 | 3.3 | |
| 3-15 | 2.3 | 65 | 10.9 | 3.1 | |
| 3-16 | 2.8 | 45 | 9.5 | 3.5 | * |
| 3-17 | 1.6 | 45 | 10.1 | 3.2 | * |
| 3-18 | 1.8 | 60 | 10.8 | 3.4 | |
| 3-19 | 3.1 | 85 | 13.9 | 3.6 | |
| 3-20 | 4.8 | 90 | 15.6 | 3.8 | * |

TABLE 11-continued

| No. | $\rho_{25}$ ($\Omega \cdot$ cm) | STATIC WITH-STANDING VOLTAGE (V/mm) | $\alpha$(%/° C.) | SCATTERING OF RESISTIVITY (CV %) | |
|---|---|---|---|---|---|
| 3-21 | 2.9 | 85 | 13.0 | 3.3 | |
| 3-22 | 3.7 | 80 | 13.8 | 3.4 | * |

The mark (*) denotes that the composition is out of the range of the present invention.

Sample numbers 3-1 to 3-22 in TABLE 10 and 11 correspond to sample numbers 1-1 to 1-22 in TABLE 1 and TABLE 2, respectively, in which the samples with the same sample numbers with each other have the same compositions.

The samples with the sample number 3-2 in TABLE 10 and TABLE 11 were heat-treated under different two kinds of oxidative atmospheres in the firing profile shown in FIG. 2. Accordingly, the samples were distinguished with each other by attaching sub-numbers as 3-2-1 and 3-2-2.

TABLE 11 shows that the samples with the compositions within the range of the present invention have the resistivities at room temperature ($\rho_{25}$) of 3.5 $\Omega$·cm or less, static withstanding voltages of 50 V/mm or more and temperature resistance coefficients ($\alpha$) of 10.8%/° C., enabling one to obtain the PTC thermistors with small scattering of resistance (CV %).

When the resistivities at room temperature ($\rho_{25}$) is especially noticed, lower values could be obtained as compared with the samples in TABLE 2 or TABLE 7 whose compositions are within the range of the present invention because the effect of firing in a reducing atmosphere and heat-treatment in an oxidative atmosphere had been expressed to increase the concentration of conductive electrons in the grains due to such firing and heat-treatment.

It is also evident from the comparison between the samples 3-2-1 and 3-2-2 in TABLE 10 and TABLE 11 that the oxygen concentration during the heat-treatment steps in the firing profile shown in FIG. 2 has substantially no effect on the characteristics of the PTC thermistors in an oxygen concentration range from 20 to 100%.

The same tendencies as the comparison of these samples in TABLE 2 are recognizable when the samples with the concentrations within the range of the present invention are compared with the samples with the concentrations out of the range of the present invention in TABLE 11.

The comparative examples in which semiconductor forming agents other than Sm were used are listed in TABLE 12 and TABLE 13 below. TABLE 12 shows the reducing atmospheres for the sintering step and oxidative atmosphere for the heat-treatment to be applied to each sample as in TABLE 10, while TABLE 13 shows the results of evaluations as shown in TABLE 11.

TABLE 12

| No. | SINTERING ATMOSPHERE | HEAT-TREATMENT ATMOSPHERE |
|---|---|---|
| 2-23 | $H_2$ 1%/$N_2$ 99% | $O_2$ 100% |
| 2-24 | $H_2$ 1%/$N_2$ 99% | $O_2$ 100% |
| 2-25 | $H_2$ 1%/$N_2$ 99% | $O_2$ 100% |
| 2-26 | $H_2$ 1%/$N_2$ 99% | $O_2$ 100% |

TABLE 13

| No. | $\rho_{25}$ ($\Omega \cdot$ cm) | STATIC WITHSTANDING VOLTAGE (V/mm) | $\alpha$ (%/° C.) | SCATTERING OF RESISTANCE (CV %) |
|---|---|---|---|---|
| 2-23 | 1.9 | 65 | 10.1 | 6.8 |
| 2-24 | 3.9 | 80 | 12.2 | 3.5 |
| 2-25 | 2.0 | 60 | 9.5 | 7.0 |
| 2-26 | 2.1 | 60 | 9.4 | 6.8 |

The sample numbers 3-23 to 3-26 in TABLE 12 and 13 correspond to the sample numbers 1-23 to 1-26 in TABLE 3 and TABLE 4, respectively, in which the same compositions are used in the samples with the same sample numbers with each other.

Comparing the samples in the comparative examples shown in TABLE 13 with the samples with the compositions within the range of the present invention shown in TABLE 11, or comparing the samples in the comparative examples shown in TABLE 4 with the samples with the compositions within the range of the present invention shown in TABLE 2, then the same tendencies in the former case are also seen in the latter case. However, it can be understood that the effect for decreasing the resistivity at room temperature ($\rho_{25}$) by firing in a reducing atmosphere and heat-treatment in an oxidative atmosphere is recognizable in the comparative examples when the comparative examples shown in TABLE 13 are compared with the comparative examples shown in TABLE 4.

In contrast to Examples 1 to 3 as hitherto described, $SiO_2$ is not used in the starting materials in the samples in Example 4 and in Examples to be described hereinafter, or the ceramics obtained do not contain $SiO_2$. The atmospheres to be used in the firing and sintering steps in Examples 4, 5 and 6 correspond to the atmospheres in Examples 1, 2 and 3, respectively, as hitherto described.

EXAMPLE 4

$BaCO_3$, $TiO_2$, PbO, $SrCO_3$, $CaCO_3$, $Sm_2O_3$ and $MnCO_3$ were used as starting materials and they were blended with wet-mixing to be the compositions as shown in TABLE 14. The terms "Ba", "Pb", "Sr" and "Ca" in TABLE 14 denote the composition ratios of the principal components "$BaTiO_3$", "$PbTiO_3$", "$SrTiO_3$" and "$CaTiO_3$", respectively, represented by mol % (the combined amount of them accounts for 100 mol %) while the additives "Sm" and "Mn" are represented by molar ratios relative to 100 moles of the principal components. It should be noted that the content of "$SiO_2$" is zero.

TABLE 14

| No. | Ba | Pb | Sr | Ca | Sm | Mn | $SiO_2$ | |
|---|---|---|---|---|---|---|---|---|
| 4-1 | 97.0 | 1 | 1 | 1 | 0.2 | 0.02 | 0 | |
| 4-2 | 60.0 | 10 | 15 | 15 | 0.2 | 0.02 | 0 | |
| 4-3 | 40.0 | 30 | 15 | 15 | 0.2 | 0.02 | 0 | |
| 4-4 | 20.0 | 50 | 15 | 15 | 0.2 | 0.02 | 0 | * |
| 4-5 | 30.0 | 50 | 10 | 10 | 0.2 | 0.02 | 0 | |
| 4-6 | 30.0 | 60 | 5 | 5 | 0.2 | 0.02 | 0 | * |
| 4-7 | 74.0 | 10 | 1 | 15 | 0.2 | 0.02 | 0 | |
| 4-8 | 45.0 | 10 | 30 | 15 | 0.2 | 0.02 | 0 | |
| 4-9 | 35.0 | 10 | 40 | 15 | 0.2 | 0.02 | 0 | * |
| 4-10 | 74.0 | 10 | 15 | 1 | 0.2 | 0.02 | 0 | |
| 4-11 | 50.0 | 10 | 15 | 25 | 0.2 | 0.02 | 0 | |
| 4-12 | 45.0 | 10 | 15 | 30 | 0.2 | 0.02 | 0 | * |
| 4-13 | 60.0 | 10 | 15 | 15 | 0.05 | 0.02 | 0 | * |
| 4-14 | 60.0 | 10 | 15 | 15 | 0.1 | 0.02 | 0 | |
| 4-15 | 60.0 | 10 | 15 | 15 | 0.3 | 0.02 | 0 | |
| 4-16 | 60.0 | 10 | 15 | 15 | 0.4 | 0.02 | 0 | * |
| 4-17 | 60.0 | 10 | 15 | 15 | 0.2 | 0.005 | 0 | * |
| 4-18 | 60.0 | 10 | 15 | 15 | 0.2 | 0.01 | 0 | |
| 4-19 | 60.0 | 10 | 15 | 15 | 0.2 | 0.03 | 0 | |
| 4-20 | 60.0 | 10 | 15 | 15 | 0.2 | 0.04 | 0 | * |

The mark (*) denotes that the composition is out of the range of the present invention.

The mark (*) denotes that the composition is out of the range of the present invention.

The compositions shown in TABLE 14 were subsequently subjected to dehydration, drying, calcination, molding and sintering steps followed by forming external electrodes under substantially the same conditions as used in Example 1 to obtain PTC thermistors as samples. Then, the resistivities at room temperature ($\rho_{25}$), static withstanding voltages, temperature resistance coefficients ($\alpha$) and dispersions of the resistance (CV %) were determined with respect to the PTC thermistors.

TABLE 15 shows the resistivities at room temperature ($\rho_{25}$), static withstanding voltages, temperature resistance coefficients ($\alpha$) and dispersions of the resistance (CV %) of the samples listed in TABLE 14.

TABLE 15

| No. | $\rho_{25}$($\Omega \cdot$ cm) | Static withstanding voltage (V/mm) | $\alpha$(%/° C.) | DISPERSION OF RESISTIVITY (CV %) | |
|---|---|---|---|---|---|
| 4-1 | 2.0 | 60 | 9.0 | 2.9 | |
| 4-2 | 2.7 | 75 | 10.5 | 3.3 | |
| 4-3 | 3.4 | 95 | 12.0 | 3.6 | |
| 4-4 | 5.1 | 105 | 13.1 | 3.4 | * |
| 4-5 | 4.7 | 95 | 12.1 | 3.6 | |
| 4-6 | 5.3 | 90 | 11.7 | 3.6 | * |
| 4-7 | 2.4 | 60 | 9.3 | 3.0 | |
| 4-8 | 4.0 | 85 | 11.6 | 3.6 | |
| 4-9 | 6.1 | 90 | 12.2 | 5.2 | * |
| 4-10 | 2.5 | 60 | 9.4 | 3.0 | |

TABLE 15-continued

| No. | $\rho_{25}$(Ω · cm) | Static withstanding voltage (V/mm) | α(%/° C.) | DISPERSION OF RESISTIVITY (CV %) | |
|---|---|---|---|---|---|
| 4-11 | 3.6 | 85 | 11.2 | 3.4 | |
| 4-12 | 5.1 | 90 | 11.5 | 3.5 | * |
| 4-13 | 5.1 | 100 | 12.6 | 4.0 | * |
| 4-14 | 4.0 | 90 | 11.9 | 3.3 | |
| 4-15 | 2.9 | 60 | 9.1 | 3.1 | |
| 4-16 | 3.6 | 50 | 7.7 | 3.4 | * |
| 4-17 | 1.5 | 50 | 8.4 | 2.8 | * |
| 4-18 | 2.0 | 60 | 9.0 | 3.2 | |
| 4-19 | 4.3 | 100 | 12.0 | 3.5 | |
| 4-20 | 6.8 | 120 | 13.4 | 4.8 | * |

The mark (*) denotes that the composition is out of the range of the present invention.

The mark (*) denotes that the composition is out of the range of the present invention.

It is evident from TABLE 14 and TABLE 15 that the resistivities at room temperature ($\rho_{25}$) of 5 Ω·cm or less, static withstanding voltages of 60 V/mm and temperature resistance coefficients (α) of 9%/° C. can be obtained with respect to the PTC thermistors manufactured by using the composite materials for the PTC thermistors having the compositions within the range of the present invention with less dispersion of the resistance at room temperature.

On the contrary, the samples 4-4, 4-6, 4-9, 4-12, 4-13 and 4-20 having compositions out of the range of the present invention have the resistivities at room temperature ($\rho_{25}$) of 5 Ω·cm or more and the samples 4-1 and 4-17 have the temperature resistance coefficients (α) of less than 10%/° C.

EXAMPLE 5

The firing profile as shown in FIG. 1 in which molded bodies were heat-treated in an oxidative atmosphere after firing in a neutral atmosphere was used as in Example 2 in firing the molded bodies comprising the composite materials for the PTC thermistors.

The same composite materials as shown in TABLE 14 and the same methods as used in the examples and comparative examples in Example 4 were used in the examples and comparative examples in Example 5, except that the firing profile as described above was used. Electrodes were formed on the sintered body after firing by the same method as used in Example 4 to manufacture the PTC thermistors to be evaluated as described previously.

The neutral atmosphere for firing and oxidative atmosphere for the heat-treatment shown in FIG. 1 were applied to each sample and the conditions are listed in TABLE 16.

TABLE 16

| No. | FIRING ATMOSPHERE | HEAT-TREATMENT ATMOSPHERE | |
|---|---|---|---|
| 5-1 | $N_2$ 100% | $O_2$ 100% | |
| 5-2-1 | $N_2$ 100% | $O_2$ 100% | |
| 5-2-2 | $N_2$ 100% | $O_2$ 20% | |
| 5-3 | $N_2$ 100% | $O_2$ 100% | |
| 5-4 | $N_2$ 100% | $O_2$ 100% | * |
| 5-5 | $N_2$ 100% | $O_2$ 100% | |
| 5-6 | $N_2$ 100% | $O_2$ 100% | * |
| 5-7 | $N_2$ 100% | $O_2$ 100% | |
| 5-8 | $N_2$ 100% | $O_2$ 100% | |
| 5-9 | $N_2$ 100% | $O_2$ 100% | * |
| 5-10 | $N_2$ 100% | $O_2$ 100% | |
| 5-11 | $N_2$ 100% | $O_2$ 100% | |
| 5-12 | $N_2$ 100% | $O_2$ 100% | * |
| 5-13 | $N_2$ 100% | $O_2$ 100% | * |
| 5-14 | $N_2$ 100% | $O_2$ 100% | |
| 5-15 | $N_2$ 100% | $O_2$ 100% | |
| 5-16 | $N_2$ 100% | $O_2$ 100% | * |
| 5-17 | $N_2$ 100% | $O_2$ 100% | * |
| 5-18 | $N_2$ 100% | $O_2$ 100% | |
| 5-19 | $N_2$ 100% | $O_2$ 100% | |
| 5-20 | $N_2$ 100% | $O_2$ 100% | * |

The mark (*) denotes that the composition is out of the range of the present invention.

The resistivities at room temperature ($\rho_{25}$), static withstanding voltages, temperature resistance coefficients (α) and dispersions of the resistances (CV %) of the samples listed in TABLE 16 are shown in TABLE 17 below.

TABLE 17

| No. | $\rho_{25}$(Ω · cm) | STATIC WITHSTANDING VOLTAGE (V/mm) | α(%/° C.) | DISPERSION OF RESISTIVITY (CV %) | |
|---|---|---|---|---|---|
| 5-1 | 1.5 | 50 | 10.0 | 3.0 | |
| 5-2-1 | 2.0 | 60 | 11.5 | 3.0 | |
| 5-2-2 | 1.9 | 60 | 11.0 | 3.1 | |
| 5-3 | 2.4 | 75 | 13.0 | 3.0 | |
| 5-4 | 3.6 | 85 | 14.3 | 3.9 | * |
| 5-5 | 3.2 | 80 | 13.1 | 2.9 | |
| 5-6 | 3.6 | 70 | 13.2 | 3.9 | * |
| 5-7 | 1.8 | 50 | 10.3 | 3.0 | |
| 5-8 | 2.9 | 65 | 12.6 | 3.3 | |
| 5-9 | 4.1 | 60 | 13.2 | 3.8 | * |
| 5-10 | 1.8 | 55 | 10.4 | 3.1 | |

TABLE 17-continued

| No. | $\rho_{25}$(Ω · cm) | STATIC WITHSTANDING VOLTAGE (V/mm) | α(%/° C.) | DISPERSION OF RESISTIVITY (CV %) | |
|---|---|---|---|---|---|
| 5-11 | 2.5 | 65 | 12.2 | 3.3 | |
| 5-12 | 3.6 | 75 | 13.0 | 3.$ | * |
| 5-13 | 3.6 | 80 | 13.6 | 3.7 | * |
| 5-14 | 2.8 | 75 | 12.9 | 3.2 | |
| 5-15 | 2.1 | 50 | 10.1 | 3.0 | |
| 5-16 | 2.5 | 35 | 8.7 | 3.3 | * |
| 5-17 | 1.4 | 40 | 9.4 | 3.0 | * |
| 5-18 | 1.5 | 50 | 10.0 | 3.2 | |
| 5-19 | 2.9 | 75 | 13.0 | 3.5 | |
| 5-20 | 4.5 | 80 | 14.4 | 3.9 | * |

The mark (*) denotes that the composition is out of the range of the present invention.

The samples 5-1 to 5-20 in TABLE 16 and TABLE 17 correspond to the samples 4-1 to 4-20 in TABLE 14 and TABLE 15, respectively, in which the same composite materials are used for each sample having the same sample numbers.

The samples with the sample number 5-2 in TABLE 16 and TABLE 17 were heat-treated under different two kinds of oxidative atmospheres in the firing profile shown in FIG. 1. Accordingly, the samples were distinguished with each other by attaching sub-numbers as 5-2-1 and 5-2-2.

TABLE 17 shows that the samples having the compositions within the range of the present invention have the resistivities at room temperature ($\rho_{25}$) of 3.5 Ω·cm or less, static withstanding voltage of 50 V/mm or more and temperature resistance coefficients (α) of 10.0%/° C. or less, enabling one to obtain the PTC resistors having small dispersion of resistivities (CV %).

Looking at the resistivities at room temperature ($\rho_{25}$), it is clear that the samples having the compositions within the range of the present invention in TABLE 17 have smaller values as compared with the samples having the compositions within the range of the present invention in TABLE 15. This is because the effects of firing in the neutral atmosphere and heat-treatment in the oxidative atmosphere have been displayed to increase the grain size in the ceramics due to such firing and heat-treatment steps.

As shown by the comparison of the sample 5-2-1 with the sample 5-2-2, are oxygen concentration within the range of 20 to 100% in the heat-treatment step in accordance with the firing profile shown in FIG. 1 has substantially no effect on the characteristics of the PTC thermistors.

Comparing the samples having the compositions within the range of the present invention with the samples having compositions out of the range of the present invention in TABLE 17, it can be seen that the same tendency obtained by comparison among these two kinds of samples in TABLE 15 are also displayed in TABLE 17.

EXAMPLE 6

The firing profile in which the molded bodies were heat-treated in an oxidative atmosphere after firing in a reducing atmosphere as shown in FIG. 2 was used in Example 6 for firing the molded bodies comprising the composite materials for the PTC thermistors.

The same composite materials and treatment conditions as used in the examples and comparative examples in Example 4 were also used in the examples and comparative examples in Example 6 to obtain the molded bodies, except that the firing profile as described above was used. Electrodes were formed on the sintered bodies after firing by the same method as used in Example 4 to manufacture the PTC thermistors as samples for the same evaluation.

The reducing atmosphere for firing and oxidative atmosphere for the heat-treatment for the firing profile shown in FIG. 2 applied to each sample are shown in TABLE 18.

TABLE 18

| No. | FIRING ATMOSPHERE | HEAT-TREATMENT ATMOSPHERE | |
|---|---|---|---|
| 6-1 | $H_2$ 1%/$N_2$ 99% | $O_2$ 100% | |
| 6-2-1 | $H_2$ 1%/$N_2$ 99% | $O_2$ 100% | |
| 6-2-2 | $H_2$ 1%/$N_2$ 99% | $O_2$ 20% | |
| 6-3 | $H_2$ 1%/$N_2$ 99% | $O_2$ 100% | |
| 6-4 | $H_2$ 1%/$N_2$ 99% | $O_2$ 100% | * |
| 6-5 | $H_2$ 1%/$N_2$ 99% | $O_2$ 100% | |
| 6-6 | $H_2$ 1%/$N_2$ 99% | $O_2$ 100% | * |
| 6-7 | $H_2$ 1%/$N_2$ 99% | $O_2$ 100% | |
| 6-8 | $H_2$ 1%/$N_2$ 99% | $O_2$ 100% | |
| 6-9 | $H_2$ 1%/$N_2$ 99% | $O_2$ 100% | * |
| 6-10 | $H_2$ 1%/$N_2$ 99% | $O_2$ 100% | |
| 6-11 | $H_2$ 1%/$N_2$ 99% | $O_2$ 100% | |
| 6-12 | $H_2$ 1%/$N_2$ 99% | $O_2$ 100% | * |
| 6-13 | $H_2$ 1%/$N_2$ 99% | $O_2$ 100% | * |
| 6-14 | $H_2$ 1%/$N_2$ 99% | $O_2$ 100% | |
| 6-15 | $H_2$ 1%/$N_2$ 99% | $O_2$ 100% | |
| 6-16 | $H_2$ 1%/$N_2$ 99% | $O_2$ 100% | * |
| 6-17 | $H_2$ 1%/$N_2$ 99% | $O_2$ 100% | * |
| 6-18 | $H_2$ 1%/$N_2$ 99% | $O_2$ 100% | |
| 6-19 | $H_2$ 1%/$N_2$ 99% | $O_2$ 100% | |
| 6-20 | $H_2$ 1%/$N_2$ 99% | $O_2$ 100% | * |

The mark (*) denotes that the composition is out of the range of the present invention.

The mark (*) denotes that the composition is out of the range of the present invention.

The resistivities at room temperature ($\rho_{25}$), static withstanding voltages, temperature resistance coefficients (α) and dispersions of the resistances (CV %) of the samples listed in TABLE 18 are shown in TABLE 19 below.

TABLE 19

| No. | $\rho_{25}(\Omega \cdot cm)$ | STATIC WITHSTANDING VOLTAGE (V/mm) | $\alpha$(%/° C.) | DISPERSION OF RESISTIVITY (CV %) | |
|---|---|---|---|---|---|
| 6-1 | 1.4 | 50 | 10.1 | 3.0 | |
| 6-2-1 | 2.0 | 60 | 11.4 | 2.9 | |
| 6-2-2 | 1.7 | 60 | 11.2 | 3.2 | |
| 6-3 | 2.3 | 75 | 13.1 | 3.0 | |
| 6-4 | 3.6 | 80 | 14.4 | 3.9 | * |
| 6-5 | 3.1 | 80 | 14.2 | 2.6 | |
| 6-6 | 3.6 | 70 | 13.1 | 3.9 | * |
| 6-7 | 1.7 | 50 | 10.1 | 3.1 | |
| 6-8 | 2.7 | 65 | 12.5 | 3.4 | |
| 6-9 | 4.1 | 60 | 13.3 | 3.8 | * |
| 6-10 | 1.6 | 55 | 10.5 | 3.3 | |
| 6-11 | 2.5 | 65 | 12.2 | 3.5 | |
| 6-12 | 3.4 | 75 | 12.9 | 3.8 | * |
| 6-13 | 3.6 | 80 | 13.5 | 3.7 | * |
| 6-14 | 2.8 | 75 | 13.0 | 3.0 | |
| 6-15 | 1.9 | 50 | 10.1 | 3.0 | |
| 6-16 | 2.4 | 40 | 8.6 | 3.5 | * |
| 6-17 | 1.3 | 40 | 9.4 | 3.1 | * |
| 6-18 | 1.5 | 50 | 9.7 | 3.3 | |
| 6-19 | 2.7 | 75 | 13.0 | 3.7 | |
| 6-20 | 4.5 | 80 | 14.6 | 3.9 | * |

The mark (*) denotes that the composition is out of the range of the present invention.

The mark (*) denotes that the composition is out of the range of the present invention.

Samples 6-1 to 6-20 in TABLE 18 and TABLE 19 correspond to the samples 4-1 to 4-20 in TABLE 14 and TABLE 15, respectively, in which the same composite materials are used for each sample having the same sample numbers.

Sample number 6-2 in TABLE 18 and TABLE 19 were heat-treated under different two kinds of oxidative atmospheres in the firing profile shown in FIG. 2. Accordingly, the samples were distinguished with each other by attaching sub-numbers as 6-2-1 and 6-2-2.

TABLE 19 shows that the samples having the compositions within the range of the present invention have resistivities at room temperature ($\rho_{25}$) of 3.5 Ω·cm or less, static withstanding voltage of 50 V/mm or more and temperature resistance coefficients ($\alpha$) of 9.7%/° C. or less, enabling to obtain the PTC resistors having small dispersion of resistivities (CV %).

Looking at the resistivities at room temperature ($\rho_{25}$), it is clear that the samples having the compositions within the range of the present invention in TABLE 19 have smaller values as compared with the samples having the compositions within the range of the present invention in TABLE 15, or as compared with the samples having the compositions within the range of the present invention in TABLE 17. This is because the effects of firing in the reducing atmosphere and heat-treatment in the oxidative atmosphere have been displayed to increase the concentration of conductive electrons in the grains due to such firing and heat-treatment steps.

As shown by the comparison of the sample 6-2-1 with the sample 6-2-2, an oxygen concentration within the range of 20 to 100% in the heat-treatment step in accordance with the firing profile shown in FIG. 2 has substantially no effect on the characteristics of the PTC thermistors.

Comparing the samples having the compositions within the range of the present invention with the samples having the compositions out of the range of the present invention in TABLE 19, it can be seen that the same tendency obtained by comparison among these two kinds of samples in TABLE 15 are also displayed in TABLE 19.

According to the present invention as hitherto described, Sm is used for the semiconductor forming agent contained in a prescribed quantity in the composite material for use in the barium titanate based PTC thermistors. Accordingly, resistivity at room temperature of the ceramic for the PTC thermistor obtained by firing the composite material described above can be lowered, for example, to 5 Ω·cm or less, the static withstanding voltage can be increased, for example, to 50 to 60 V/mm or more, and the temperature resistance coefficient can be increased, for example, to 9%/° C., along with reducing dispersion of the resistance. Therefore, the PTC thermistor to be used for protecting electric circuits can be manufactured with excellent productivity.

Firing the composite material for the PTC thermistor according to the present invention in a neutral atmosphere followed by heat-treating in an oxidative atmosphere allows the ceramic for the PTC thermistor to have a lower resistivity at room temperature.

When a reducing atmosphere is used in the foregoing firing step instead of the neutral atmosphere, the resistivity at room temperature can be reduced.

What is claimed is:

1. A method for manufacturing the ceramic for use in a PTC thermistor comprising providing a $BaTiO_3$-containing composite material containing a semiconducting additive, firing the composite material in a neutral or reducing atmosphere and then heat-treating the fired material in an oxidative atmosphere, wherein the composite material comprises a principal component containing about 30 to 97 mol % of $BaTiO_3$; about 1 to 50 mol % of $PbTiO_3$; about 1 to 30 mol % of $SrTiO_3$; and about 1 to 25 mol % of $CaTiO_3$, wherein the total content of $BaTiO_3$ $PbTiO_3$ $SrTiO_3$ and $CaTiO_3$ is 100 mol %; and relative to 100 moles of the principal component, as additives, about 0.1 to 0.3 moles of Sm as Sm in a compound containing Sm; about 0.01 to 0.03 moles of Mn as Mn in a compound containing Mn; and 0 to about 2.0 moles of Si as Si in a compound containing Si.

2. The method for manufacturing the ceramic for use in the PTC thermistor according to claim 1 wherein the firing is in a neutral atmosphere.

3. The method for manufacturing the ceramic for use in the PTC thermistor according to claim 1, wherein the firing is in a reducing atmosphere.

4. The method for manufacturing the ceramic for use in the PTC thermistor according to claim 3, wherein the reducing atmosphere comprises hydrogen and nitrogen.

5. The method for manufacturing the ceramic for use in the PTC thermistor according to claim 2, wherein the neutral atmosphere is nitrogen.

6. The method for manufacturing the ceramic for use in the PTC thermistor according to claim 1, wherein the amount of Si is greater than 0 moles and the oxidative atmosphere contains at least 20% oxygen.

7. The method for manufacturing the ceramic for use in the PTC thermistor according to claim 6, wherein the firing is in a reducing atmosphere.

8. The method for manufacturing the ceramic for use in the PTC thermistor according to claim 7, wherein the reducing atmosphere comprises hydrogen and nitrogen.

9. The method for manufacturing the ceramic for use in the PTC thermistor according to claim 6 wherein the firing is in a neutral atmosphere.

10. The method for manufacturing the ceramic for use in the PTC thermistor according to claim 9, wherein the neutral atmosphere is nitrogen.

* * * * *